Figure 6:
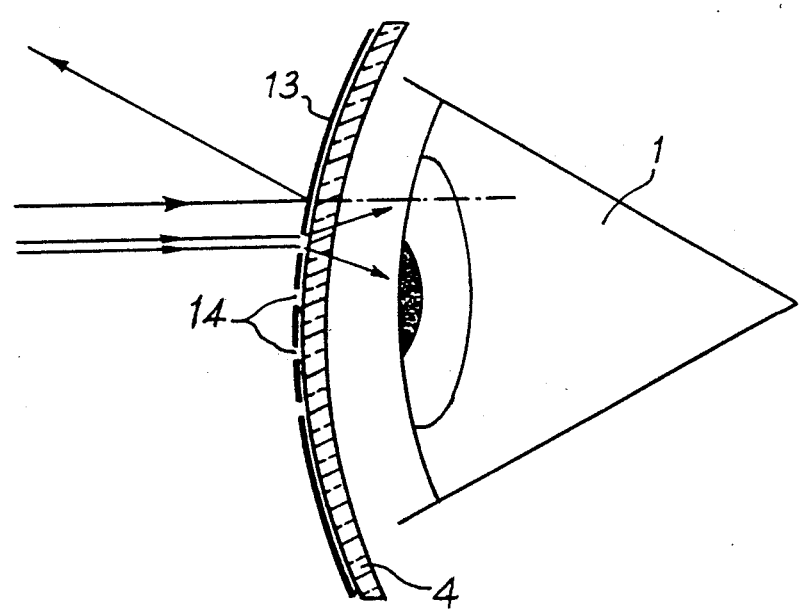

United States Patent [19]

Binh et al.

[11] Patent Number: 4,958,922
[45] Date of Patent: Sep. 25, 1990

[54] UNIVERSAL VISION CORRECTOR

[76] Inventors: Paul Binh, 17, rue Dailly, 92210 Saint-Cloud; Paul Blanié, 282, rue St-Jacques, 75006 Paris, both of France

[21] Appl. No.: 319,904

[22] Filed: Mar. 6, 1989

Related U.S. Application Data

[63] Continuation of Ser. No. 133,258, Dec. 14, 1987, abandoned, which is a continuation of Ser. No. 752,193, filed as PCT FR84/00244 on Oct. 26, 1984, published as WO85/02028 on May 9, 1985, abandoned.

[30] Foreign Application Priority Data

| Oct. 28, 1983 | [FR] | France | 831244 |
| Jul. 19, 1984 | [FR] | France | 8411447 |
| Oct. 12, 1984 | [FR] | France | 8400388 |

[51] Int. Cl.$^5$ .............................. G02C 7/16
[52] U.S. Cl. .............................. 351/46
[58] Field of Search ............ 351/46, 165, 128, 162

[56] References Cited

U.S. PATENT DOCUMENTS

| 459,563 | 9/1891 | Groh | 351/46 |
| 2,856,813 | 10/1958 | Kudelko | 351/128 |
| 3,507,566 | 4/1970 | Knapp | 351/46 |
| 4,249,803 | 2/1981 | Byler | 351/46 |

FOREIGN PATENT DOCUMENTS

| 621084 | 11/1935 | Fed. Rep. of Germany . |
| 389850 | 3/1909 | France . |
| 1020646 | 2/1953 | France . |
| 1330277 | 5/1963 | France .................... 351/46 |
| 2389912 | 12/1978 | France . |
| 2498769 | 7/1982 | France .................... 351/46 |
| 7201 | 6/1983 | France . |
| 447650 | 3/1968 | Switzerland . |

Primary Examiner—Rodney B. Bovernick
Attorney, Agent, or Firm—Sandler, Greenblum & Bernstein

[57] ABSTRACT

A universal vision corrector particularly applicable to myopia, hypermetropia, astigmatism and presbyopia comprises, in front of the eye, an opaque zone (2) surrounding a small central area (3) situated in the vision axis, said small central transparent area (3) forming diaphragm and creating a reduced retinal giving a net vision. The opaque zone (2) is continuous, has a minimum average diameter of 3 mm and a maximum average diameter of 8 mm to preserve the peripheral vision and the central transparent area (3) has the surface comprised between 0.2 and 3.5 mm$^2$, and preferably between 0.5 and 1 mm$^2$.

38 Claims, 2 Drawing Sheets

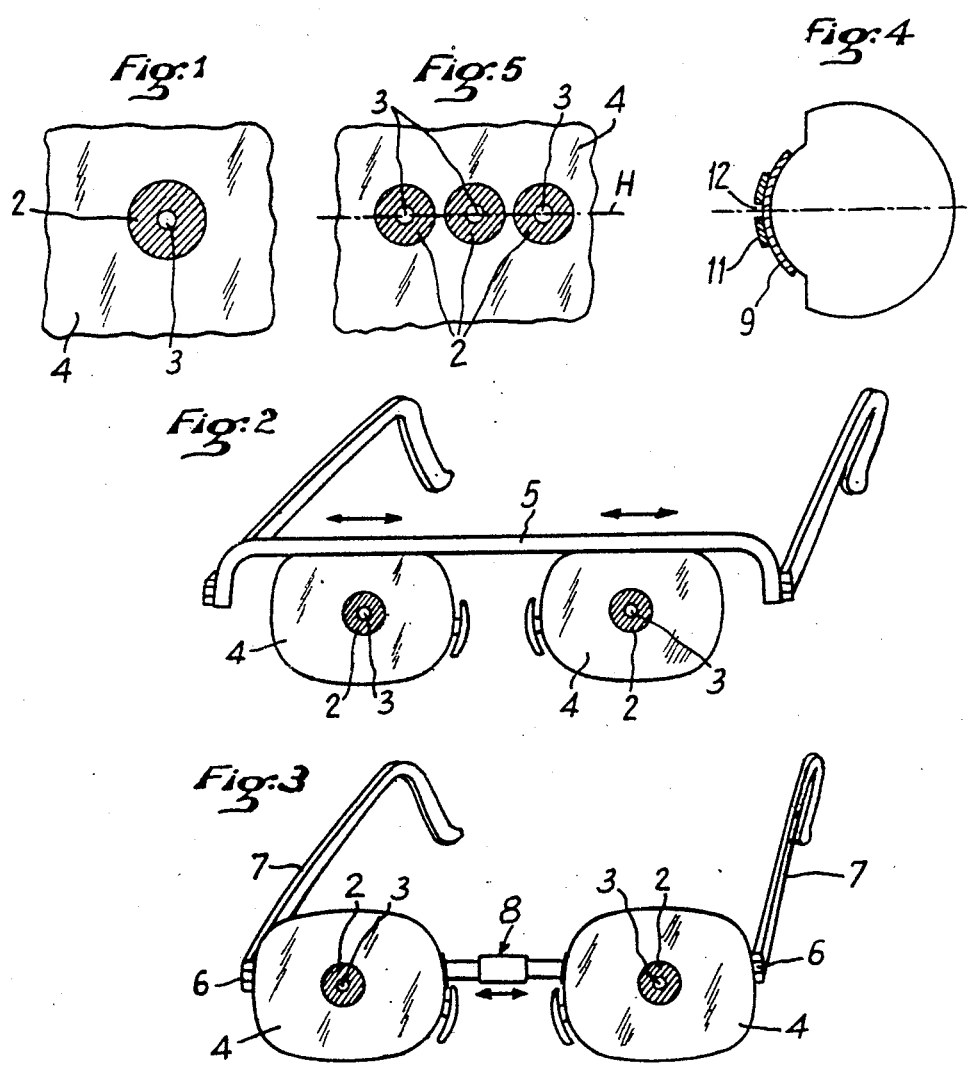

UNIVERSAL VISION CORRECTOR

This application is a continuation, of application Ser. No. 133,258, filed Dec. 14, 1987, which is in turn, a continuation of Ser. No. 06/752,193 filed as PCT FR 84/00244 on Oct. 26, 1984, published as WO85/02028 on May 9, 1985, both now abandoned.

This invention relates to a universal vision corrector, particulary useful in correcting astigmatism, hypertropia, and long- and short-sightedness.

Hitherto, for correcting these defects, correcting lenses were used, of which the focal length was such that in all cases the light rays appeared to come from the "punctum remotum" of the eye, with a result that the eye could not adjust itself to them.

Known spectacles have "lenses" which consist of opaque perforated discs, for instance, those described in the patent U.S. Pat. No. 3,967,885. A pair of spectacles of this kind has the disadvantage that the overall opacity of the "lenses" results in a lateral occlusion of vision and a permanent dilatation of the pupil which, in turn, results in tetany of the muscle that controls dilatation and contraction of the pupil.

Also known, as described in patent U.S. Pat. No. 3,794,414 is a bifocal contact lens for longsightedness. This lens has a central transparent zone surrounded by a succession of individual opaque zones separated from one another by transparent holes. But it is undoubted that a contact lens according to this patent can in no way be a universal vision corrector.

The present invention relates to a vision corrector of particularly elegant nature.

To this end, the vision corrector of the present invention includes, in front of the eye, an opaque zone surrounding a small, transparent zone situated on the axis of vision. This small transparent zone constitutes a diaphragm and creates a reduced retinal image to produce clear vision. The present invention may be further characterized in that the opaque zone is continuous; has an average minimum diameter of about 3 mm and a maximum diameter of about 8 mm, to retain peripheral vision; and, the central transparent zone has a surface area of from about 0.2 to 3.5 mm$^2$, with a range of from about 0.5 to 1.0 mm$^2$ being preferred.

By "opaque zone" is meant the whole surface that prevents light rays from reaching the eye, while the "transparent zone" is a hole or a solid portion that allows passage of light rays.

The opaque zone surrounding the central transparent zone can be independently constructed and of opaque material forming a kind of annulus, or it can be formed on the front or rear surface of a support of transparent material. The central transparent zone, in this case, is provided by the support material or by a hole in it.

A single vision corrector according to the invention can be used to correct classic visual defects such as myopia, hypermetropia, astigmatism, and longsightedness, because the retinal image provides clear vision while preserving peripheral vision which is for practical purposes indispensable for normal social contacts.

The central transparent zone preferably has an area of 0.5 to 1.0 mm$^2$ while the opaque zone preferably has a diameter of 4 mm to 5 mm.

For normal eye defects, from 0.25 to 10 diopters, the device of the invention provides correct vision without aberration, for a central transparent zone having an area of about 0.8 mm$^2$ (diameter of 1 mm).

Because the eye is mobile, vertical and horizontal fields of vision are respectively 120° and 150°. Although the field of clear vision is only 1 minute of arc, the field of clear vision can be increased by associating, on the same transparent support, several annuli, that is to say several central transparent zones surrounded respectively by opaque zones. The distance between the transparent zones is a function of the foregoing diameters, to avoid interference. This arrangement allows the normal field of vision to be restored without necessitating any turning of the head.

The central transparent zone can be of any appropriate shape, e.g., round rectangular or elliptical. The surrounding opaque zone may or may not have a similar configuration.

The corrector of the invention can be put to very different uses. It is especially useful in the form of a pair of spectacles. In this case the interpupilar distance, which for men is generally from about 63 to 68 mm and for women is generally from about 60 to 64 mm, must be taken into account. Several solutions present themselves. The first is for each transparent support to be adjustably mounted in position on a common transverse and horizontal bar, which, when adjusted to the required pupilar distance, is locked in position in any suitable way. A second solution is for the mount to have two fixed parts connected by an intermediate bar, of length suitable to be adapted to the interpupilar distance of a range of people. A third solution is for the mounting and the lenses to be fixed and the positioning of the transparent zones in each of the lenses to be chosen as a function of the interpupilar distance of the user.

The corrector of the invention may also be used with apparatus such as photographic equipment, binoculars, microscopes etc., to improve the vision of a user whose sight needs correction. In this case the transparent support presenting the central transparent zone surrounded by the opaque zone can be fixed directly to the eye piece, for instance by glueing, or preferably 1 cm away from it, to increase the field of vision. The opaque zone can be formed directly in the eye piece itself as, for-example, by engraving or in any other way.

Similarly the same technique can be utilized for protective glasses, for welders, miners, mountain climbers etc.

It can also be adapted to television spectacles, the transparent support being slightly tinted, or to three-dimensional glasses with a transparent red lens on one side and a blue lens on the other.

As far as the preceeding applications are concerned, normal vision is not affected by the correctors of the invention that provide opaque zones surrounding central transparent zones. There is a simple increase of contrast and total compatibility. Optometric experience shows that maximum comfort for a normal eye is obtained when a pin hole diaphragm is placed in front of the eye.

Figure 7:
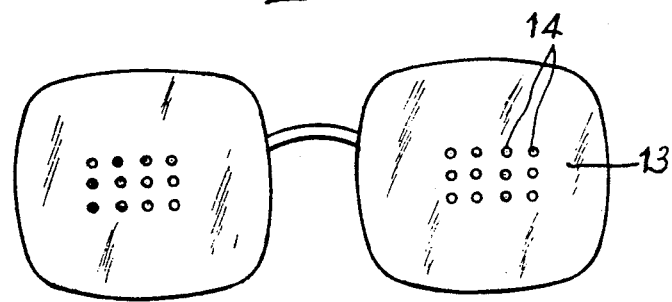

There are described hereinafter by way of non-limiting example various embodiments of the invention with reference to the annexed drawings in which:

FIG. 1 is an elevation of a corrector for ametropias,

FIG. 2 is a perspective view of a corrector in the form of a pair of spectacles, FIG. 3 is a perspective view of a variant embodiment of a pair of spectacles utilizing the corrector of the invention, FIG. 4 shows schematically a vertical section through a corrector in the form of a contact lens, FIG. 5 is an elevation of an alternative method of construction of the corrector, FIG. 6 shows schematically a vertical section of another embodiment, FIG. 7 is an elevation of the corrector in the form of a pair of spectacles.

The universal corrector for ametropias according to the invention which is represented in FIG. 1 comprises an opaque zone 2 surrounding a central transparent zone 3 of small dimension and forming a diaphragm. This central transparent zone 3 can be of any appropriate shape such as circular, polygonal, elliptical or any other shape and the same applies to the opaque zone 2 surrounding it. The surface of the opaque zone 2 conforms to that of the surface of the transparent central zone 3 or may be different from it.

As a result of several tests it has been found that the surface of the central transparent zone 3 forming a diaphragm ought to be between about 0.2 and 3.5 mm$^2$. For example an area of 0.5 mm$^2$ permits good correction of normal eye defects from about 0.25 to 10 diopters, the opaque zone 2 surrounding it having a minimum surface area of 27 mm$^2$. Applying these conditions, clear vision is obtained whatever the state of vision that is to be corrected, and without aberration.

It is a surprising aspect of the invention that the corrector, due to the presence of the continuous opaque zone of small dimensions, enables clear images to be obtained while preserving peripheral vision.

The opaque zone 2 can be totally independent and it can constitute a sort of annulus, or "washer" of opaque material, the central transparent zone being a simple hole. The opaque zone 2 can also be glued onto a support of transparent material as is shown in FIG. 1, the central transparent zone then being constitued by a portion of the support 4 at the centre of the opaque zone 2.

The transparent support 4 can have the shape of normal spectacles as is shown in FIGS. 2 and 3.

FIG. 2 shows a pair of spectacles having a common transverse and horizontal bar 5 under which are fixed two transparent supports 4 associated respectively with the two eyes. Each of the supports can be displaced on the bar 5, for example by up to 2 mm, to permit adjustment of the distance between the two supports 4 to the interpupilar distance of the wearer. Once the correct distance has been obtained, each support 4 is fixed to the bar 5 by any appropriate means, for example by clips or by quicksetting glue.

In the modification shown in FIG. 3, the frame of the pair of spectacles is constituted in two parts each of which comprises a transparent support 4 on which is articulated, about a pivot 6, and arm 7 of the frame. The two supports 4 are also connected horizontally by an intermediate bar 8 of variable length corresponding to the interpupilar distance of the wearer. This intermediate bar 8 can be made in telescoping form.

The corrector according to the invention can also form part of a lorgnette, the two annuli then being connected by a simple wire to the part of the lorgnette that makes contact with the nose.

FIG. 4 illustrates the use of a corrector as a contact lens. This contact lens comprises, as in the previous embodiment, a transparent support 9 having a curved surface of which the radius corresponds to that of the cornea. The transparent support 9 also has an opaque zone 11 surrounding a central transparent zone 12 of small dimension.

FIG. 5 illustrates a case of several opaque zones 2 provided on the same transparent support 4 and aligned along a horizontal plane H and each of them surrounding a central transparent zone 3 of small dimension. Three neighbouring opaque zones 2 suffice to assure good vision in the horizontal field. Similar means can be adopted for the vertical plane.

According to a variant embodiment of the invention, the corrector can be constituted by a piece of opaque band which is perforated at regular intervals with holes in quincunx, the distance between the elementary holes forming diaphragms being either greater than or equal to 3 mm.

It is therefore possible to cut to the desired length pieces of perforated opaque band the holes of which form diaphragms, the band portions being capble of being glued as such onto transparent supports.

According to another variant embodiment of the invention in the case of use of the corrector in the form of a pair of spectacles, the corrector can be constituted by an opaque annulus with a central transparent part which is applied by screen printing or other suitable means on each of the two lenses of normal spectacles and in positions corresponding to the interpupilar distance of the wearer. Around the main annulus corresponding to the interpupilar distance are disposed in quincunx auxiliary annuli. This permits a single standard frame to be utilized provided with transparent lenses, for all users regardless of their interpupilar distances.

The corrector which is seen in FIGS. 6 and 7 in front of an eye 1, consists of a transparent support 4 for example of glass or plastic material, on the front face of which there is a thin light reflecting layer. This layer 13 does not reflect the totality of the incident light rays but it allows a portion, more or less small, of the incident luminous flux to pass through, so that the eye can see through the thin layer 13 although it is relatively opaque, but with a diminution of luminosity. In the thin reflecting slightly transparent layer 13, transparent zones 14 are left, of small dimension which constitute "diaphragms". The transparent zones 14 can also be provided by holes pierced here and there in the transparent support 4 and the thin reflecting coating 13.

As a result of numerous experiments it is apparent that the surface of each transparent zone 14 forming a diaphragm should be between about 0.2 and 3.5 mm$^2$ and preferably close to 1 mm$^2$.

The transparent support 4 can be of the usual shape of the lenses of a pair of spectacles as shown in FIG. 7. In this case each lens presents a front reflecting surface 13 in the central area of which is formed a group of transparent zones 14 spaced from one another. These zones 14 are advantageously spaced apart at a minimum distance of about 3 mm. They can be arranged according to a regular pattern, that is to say in lines and columns as is shown in FIG. 7.

In the case of permanent correction, the corrector can be a corneal lens, that is to say a contact lens on which is provided, by screen printing or other suitable means, a central transparent zone surrounded by an opaque border. The manufacture of these lenses is considerably simplified in comparison with known contact lenses in present use. In fact a single model can be put to use for all people requiring correction of vision whatever it may be. Two or three different radii of curvature can be provided to conform with the diameters of the corneas to be treated.

These lenses must have a slight mobility in front of the pupil. If they are made of a suitable material, lenses can be disposable so that they require no maintenance and/or can be permanently worn.

In the case of a corrector being a corneal lens or contact lens, preferably the known opaque zone could be used as container for a liquid product useful for therapeutic or hygienic functions.

We claim:

1. An apparatus for correcting vision using at least one lens, comprising: at least one transparent zone situated on the axis of vision of each said lens, said transparent zone having a surface area of between about 0.2 and 3.5 mm$^2$; and at least one opaque zone surrounding said transparent zone, said opaque zone having an average diameter of between about 3 and 8 mm.

2. The apparatus for correcting vision as defined by claim 1, wherein said transparent zone has a surface area of between about 0.5 and 1 mm$^2$.

3. The apparatus for correcting vision as defined by claim 1, wherein each said lens comprises a support of transparent material, and wherein said opaque zone is formed on a surface of said support.

4. The apparatus for correcting vision as defined by claim 2, wherein each said lens comprises a support of transparent material, and wherein said opaque zone is formed on a surface of said support.

5. The apparatus for correcting vision as defined by claim 1, wherein said transparent zone constitutes an aperture.

6. The apparatus for correcting vision as defined by claim 2, wherein said transparent zone constitutes an aperture.

7. The apparatus for correcting vision as defined by claim 4, wherein said transparent zone constitutes an aperture.

8. An apparatus for correcting vision using at least one lens, comprising: a plurality of transparent zones situated on the axis of vision of each said lens, each of said transparent zones having a surface area of between about 0.2 and 3.5 mm$^2$; and at least one opaque zone surrounding each of said transparent zones, each said opaque zone having an average diameter of between about 3 and 8 mm.

9. The apparatus for correcting vision as defined by claim 8, wherein each of said transparent zones has a surface area of between about 0.5 and 1 mm$^2$.

10. The apparatus for correcting vision as defined by claim 8, wherein each said lens comprises a support of transparent material, and wherein each said opaque zone is formed on a surface of said support.

11. The apparatus for correcting vision as defined by claim 10, wherein said transparent zone constitutes an aperture in said support.

12. The apparatus for correcting vision as defined by claim 8, wherein said plurality of transparent zones are vertically aligned.

13. The apparatus for correcting vision as defined by claim 10, wherein said plurality of transparent zones are vertically aligned.

14. The apparatus for correcting vision as defined by claim 8, wherein said plurality of transparent zones are horizontally aligned.

15. The apparatus for correcting vision as defined by claim 10, wherein said plurality of transparent zones are horizontally aligned.

16. The apparatus for correcting vision as defined by claim 8, wherein said plurality of transparent zones are aligned both vertically and horizontally.

17. The apparatus for correcting vision as defined by claim 10, wherein said plurality of transparent zones are aligned both vertically and horizontally.

18. The apparatus for correcting vision as defined by claim 1, wherein said at least one lens comprises a first lens and a second lens, said apparatus further comprising a frame element for carrying said first and second lenses and means for adjusting the distance between said first and second lenses on said frame element to adapt to a wearer's interpupilary distance.

19. The apparatus for correcting vision as defined by claim 4, wherein said at least one lens comprises a first lens and a second lens, said apparatus further comprising a frame element for carrying said first and second lenses and means for adjusting the distance between said first and second lenses on said frame element to adapt to a wearer's interpupilary distance.

20. The apparatus for correcting vision as defined by claim 6, wherein said at least one lens comprises a first lens and a second lens, said apparatus further comprising a frame element for carrying said first and second lenses and means for adjusting the distance between said first and second lenses on said frame element to adapt to a wearer's interpupilary distance.

21. The apparatus for correcting vision as defined by claim 9, wherein said at least one lens comprises a first lens and a second lens, said apparatus further comprising a frame element for carrying said first and second lenses and means for adjusting the distance between said first and second lenses on said frame element to adapt to a wearer's interpupilary distance.

22. The apparatus for correcting vision as defined by claim 12, wherein said at least one lens comprises a first lens and a second lens, said apparatus further comprising a frame element for carrying said first and second lenses and means for adjusting the distance between said first and second lenses on said frame element to adapt to a wearer's interpupilary distance.

23. The apparatus for correcting vision as defined by claim 14, wherein said at least one lens comprises a first lens and a second lens, said apparatus further comprising a frame element for carrying said first and second lenses and means for adjusting the distance between said first and second lenses on said frame element to adapt to a wearer's interpupilary distance.

24. The apparatus for correcting vision as defined by claim 16, wherein said at least one lens comprises a first lens and a second lens, said apparatus further comprising a frame element for carrying said first and second lenses and means for adjusting the distance between said first and second lenses on said frame element to adapt to a wearer's interpupilary distance.

25. The apparatus for correcting vision as defined by claim 8, wherein said plurality of transparent zones are positioned in a quincunx formation, and further wherein the distance between each of said transparent zones in each said formation is equal to or greater than 3 mm.

26. The apparatus for correcting vision as defined by claim 18, wherein said plurality of transparent zones are positioned in a quincunx formation on each of said first and second lens, and further wherein the distance between each of said transparent zones in each said formation is equal to or greater than 3 mm.

27. The apparatus for correcting vision as defined by claim 1, wherein each said opaque zone is formed of an opaque material that is independent of any material of which each said transparent zone is formed, each said opaque zone having an annular shape.

28. The apparatus for correcting vision as defined by claim 1, wherein each of said at least one lens is a contact lens.

29. The apparatus for correcting vision as defined by claim 8, wherein each of said at least one lens is a contact lens.

30. The apparatus for correcting vision as defined by claim 1, wherein the outer surface of each said lens comprises a mirrored, reflective surface whereby light is reflected off each said lens without blocking vision outwardly through each said lens.

31. The apparatus for correcting vision as defined by claim 8, wherein the outer surface of each said lens comprises a mirrored, reflective surface whereby light is reflected off each said lens without blocking vision outwardly through each said lens.

32. The apparatus for correcting vision as defined by claim 18, wherein the outer surface of each said lens comprises a mirrored, reflective surface whereby light is reflected off each said lens without blocking vision outwardly through each said lens.

33. The apparatus for correcting vision as defined by claim 28, wherein the outer surface of each said lens comprises a mirrored, reflective surface whereby light is reflected off each said lens without blocking vision outwardly through each said lens.

34. A method for treating vision disorders, comprising obtaining corrected vision by wearing the apparatus as defined by claim 1.

35. A method for treating vision disorders, comprising obtaining corrected vision by wearing the apparatus as defined by claim 8.

36. A method for treating vision disorders, comprising obtaining corrected vision by wearing the apparatus as defined by claim 18.

37. A method for treating vision disorders, comprising obtaining corrected vision by wearing the apparatus as defined by claim 25.

38. A method for treating vision disorders, comprising obtaining corrected vision by wearing the apparatus as defined by claim 29.

* * * * *